United States Patent
Cross (10) Patent No.: US 6,286,854 B1
(45) Date of Patent: Sep. 11, 2001

(54) FOLDING TRAILER FOR AN ALL-TERRAIN VEHICLE

(75) Inventor: Gary Cross, Estherville, IA (US)

(73) Assignee: Cycle Country Accessories Corp., Milford, IA (US)

( * ) Notice: Subject to any disclaimer, the term of this patent is extended or adjusted under 35 U.S.C. 154(b) by 0 days.

(21) Appl. No.: 09/821,262

(22) Filed: Mar. 29, 2001

Related U.S. Application Data (62) Division of application No. 09/542,400, filed on Apr. 4, 2000.

(51) Int. Cl.[7] .................................................. B60D 1/02
(52) U.S. Cl. ........................ 280/504; 280/515; 280/494
(58) Field of Search ............................. 280/504, 514, 280/515, 489, 488, 492, 511, 494, 493; 414/462

(56) References Cited

U.S. PATENT DOCUMENTS

| | | | |
|---|---|---|---|
| D. 376,564 | 12/1996 | Mishoe | D12/101 |
| D. 417,172 | 11/1999 | Smith et al. | D12/101 |
| 2,254,437 | 9/1941 | Marney | 280/401 |
| 2,706,055 | 4/1955 | Nichols | 280/401 |
| 2,809,046 | 10/1957 | Andersson | 280/401 |
| 3,953,055 * | 4/1976 | Stark | 280/504 |
| 3,989,264 | 11/1976 | Lovendahl | 280/401 |
| 4,448,439 * | 5/1984 | Huffman | 280/504 X |
| 5,295,555 | 3/1994 | Strange | 182/63 |
| 5,354,090 * | 10/1994 | Grovom | 280/656 |
| 5,494,309 | 2/1996 | Roy | 280/401 |
| 5,562,298 * | 10/1996 | Kass et al. | 280/504 X |
| 5,647,604 * | 7/1997 | Russell | 280/492 |
| 5,658,003 | 10/1957 | Jensen | 280/491.1 |
| 5,823,560 * | 10/1998 | Van Vleet | 280/511 X |

FOREIGN PATENT DOCUMENTS

| | | | |
|---|---|---|---|
| 185 249 | 8/1939 | (AT) | 280/401 |
| 845 736 | 8/1939 | (FR) | 280/401 |

* cited by examiner

*Primary Examiner*—J. J. Swann
*Assistant Examiner*—F. Zeender
(74) *Attorney, Agent, or Firm*—Zarley, McKee, Thomte, Voorhees & Sease; Dennis L. Thomte

(57) ABSTRACT

A folding trailer is described including a wheeled first frame portion having a tongue secured thereto which extends forwardly therefrom for connection to a hitch adapter which is mounted on the hitch of the an all-terrain vehicle. A second frame portion is pivotally secured to the rearward end of the wheeled frame portion and a rear frame portion is pivotally secured to the rearward end of the second frame portion in such a manner that it may be pivotally moved upwardly from a horizontally disposed position on the rearward end of the second frame portion to an upwardly extending position. The rear frame portion may be folded onto the second frame portion with those frame portions being folded upon the wheeled frame portion. The trailer may then be pivotally moved upwardly and secured to the rack of the all-terrain vehicle.

5 Claims, 7 Drawing Sheets

FOLDING TRAILER FOR AN ALL-TERRAIN VEHICLE

CROSS-REFERENCE TO RELATED APPLICATION

This is a divisional application of Petitioner's earlier application Ser. No. 09/542,400 filed Apr. 4, 2000, entitled "A FOLDING TRAILER FOR AN ALL-TERRAIN VEHICLE".

BACKGROUND OF THE INVENTION

1. Field of the Invention

This invention relates to a folding trailer and more particularly to a folding trailer which may be attached to an all-terrain vehicle (ATV).

2. Description of the Related Art

ATVs are gaining in popularity and are used extensively by farmers, gardeners, ranchers, sportsmen, etc. Most ATVs have a hitch secured to the rear end of the vehicle so that the vehicle may pull a trailer or the like. Many types of trailers have been provided for use with the ATVs. In fact, the assignee of the instant invention is the owner of design patent number Des. 417,172 issued Nov. 30, 1999, which illustrates a folding trailer. A collapsible portable trailer for all-terrain vehicles is also disclosed in U.S. Pat. No. 5,354,090. Although the folding trailers disclosed in the above-identified patents apparently perform satisfactorily to some degree, neither of the folding trailers are as convenient to use as desirable and do not provide the necessary hitch connection for the trailer which enables the trailer to not only be conveniently folded for storage on the ATV itself, but which also provides the necessary flexibility between the trailer and the vehicle so that the trailer will not be damaged when the vehicle is traversing rough terrain.

SUMMARY OF THE INVENTION

A folding trailer is provided for use with an all-terrain vehicle (ATV). The trailer includes a first frame portion which has ground-engaging wheels secured thereto which extend downwardly therefrom. A second frame portion is pivotally secured to the rearward end of the first frame portion and is pivotally movable between an operative position wherein it is parallel to the first frame portion to a second position where it is folded on top of the first frame portion. A rear frame portion is pivotally secured at its lower end to the rearward end of the second frame portion and is pivotally movable from an upstanding position to a folded position adjacent the upper surface of the second frame portion. A first elongated tongue is pivotally secured to the forward end of the first frame portion and is selectively prevented from pivotal movement with respect to the first frame portion during the times that the trailer is being used in its transport position. A second tongue member is pivotally secured, about a vertical axis, to the forward end of the first tongue member, and extends forwardly for connection to a unique hitch member which is secured to the hitch of the ATV. The forward end of the second tongue member is pivotally secured to a hitch adapter by means of a horizontally disposed removable pin. The hitch adapter is secured to the hitch of the ATV.

When it is desired to fold the trailer from its transport position to its folded position, the rear frame portion is folded onto the top of the second frame portion with the rear and second frame portions then being folded on top of the first frame portion. The pin which extends through the rearward end of the first tongue member, to prevent pivotal movement of the first tongue member with respect to the first frame portion, is removed. The folded frame portions are then pivotally moved upwardly to a substantially vertically disposed position and are supported upon a trailer support which is secured to the rack of the ATV. Preferably, straps are then used to maintain the trailer on the rack in the vertically disposed position. The hitch adapter is unique in that it compensates for different types of ATV hitches and for different heights of ATV hitches.

It is therefore a principal object of the invention to provide an improved folding trailer for an all-terrain vehicle.

Still another object of the invention is to provide a folding trailer for an all-terrain vehicle wherein the trailer may be folded to a substantially vertically disposed position and supported on the rack of the ATV.

Still another object of the invention is to provide a folding trailer for an all-terrain vehicle which provides the necessary flexibility between the vehicle and the trailer to prevent damage to the trailer when the vehicle is traversing rough ground.

Still another object of the invention is to provide a folding trailer for an all-terrain vehicle including a unique hitch adapter which is adjustable and reversible to accommodate hitches of different configurations.

Still another object of the invention is to provide a folding trailer for an all-terrain vehicle which is convenient to use and which is economical of manufacture.

These and other objects will be apparent to those skilled in the art.

DESCRIPTION OF THE PREFERRED EMBODIMENT

The folding trailer of this invention is referred to generally by the reference numeral 10 while the reference numeral 12 refers to a conventional all-terrain vehicle (ATV) having a forward end 14 and a rearward end 16. For purposes of description, vehicle 12 will be described as including a body 18 mounted on a frame 20. Vehicle 12 also includes a conventional rear suspension system which normally consists of a pair of shock absorbers or the like which extend between the body 18 and the frame 20 to permit the rearward end of the body 18 to move upwardly and downwardly with respect to the frame 20 and vice versa. The vehicle 12 also includes a conventional suspension system at the forward end thereof.

The rear wheels of the vehicle 12 are mounted on the opposite ends of axles which are normally enclosed within an axle housing 22 having a rearwardly extending hitch 24 secured thereto which includes an opening 26 formed therein to accommodate a hitch pin, bolt or the like.

For purposes of description, trailer 10 will be described as including a tongue assembly 28, first frame portion 30, second frame portion 32, and rear frame portion 34. Although it is preferred that first and second frame portions be utilized, the second frame portion could be omitted if desired with the rear frame portion 34 then being mounted on the rear end of the first frame portion 30. Further, in some cases, the owner of the trailer may not wish to utilize a rear frame portion. The numeral 36 refers to a wheel assembly which is secured to front frame portion 30 for engagement with the ground to support the trailer in its transport or operative position.

Figure 1:
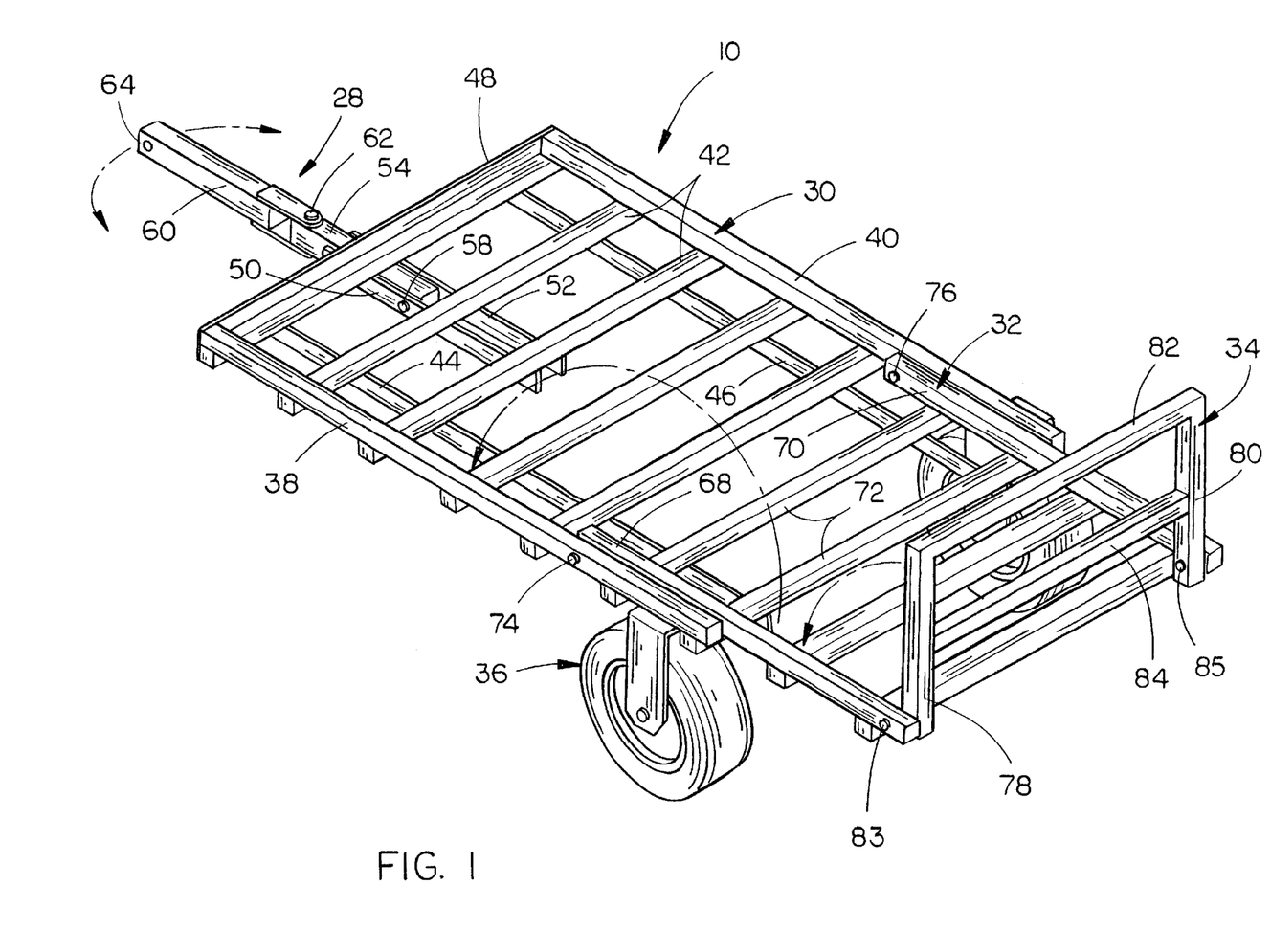
FIG. 1 is a rear perspective view of the trailer of this invention.
Figure 2:
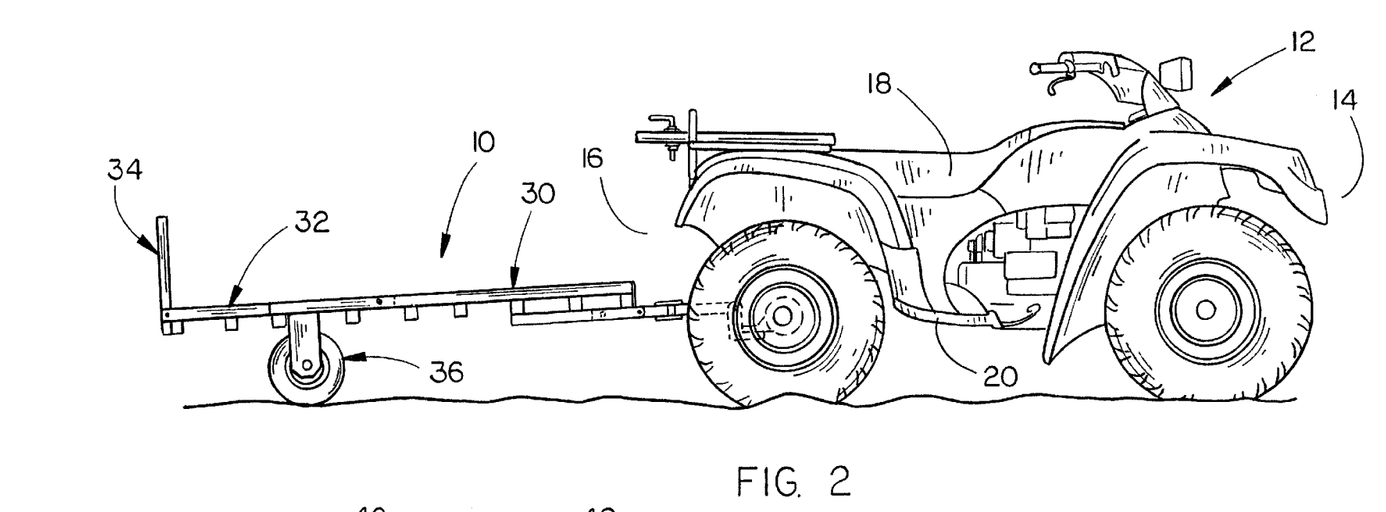
FIG. 2 is a side view of the trailer of this invention secured to an all-terrain vehicle.

Front frame portion 30 includes side frame members 38 and 40 having a plurality of cross members 42 welded to the undersides thereof which extend therebetween. Braces 44 and 46 are welded to the undersides of cross members 42 and extend therebetween, as illustrated in the drawings. Further, an upstanding bar 48 is welded to the forward end of the forwardmost cross member 42 and extends between the forward ends of side frame members 38 and 40. A pair of flat bar members 50 and 52 are welded to the undersides of the forwardmost cross members 42, as seen in FIG. 1, and have their forward ends disposed forwardly of the forwardmost cross member 42.

Tongue assembly 28 includes an elongated tongue member 54 which has its forward end pivotally secured to the forward ends of bar members 50 and 52 by means of bolt or pin 56 extending therethrough. A removable bolt or pin 58 extends through bar members 50 and 52 and the rearward end of tongue member 54 when the trailer is to be positioned in its transport position (FIG. 1).

Tongue assembly 28 also includes elongated tongue member 60 which has its rearward end pivotally secured to the forward end of tongue member 54 by means of bolt or pin 62 extending vertically downwardly therethrough. The forward end of tongue member 60 has a horizontally disposed opening 64 formed therein to enable the tongue assembly to be pivotally connected, about a horizontal axis, to a hitch adapter 66 which will be described in more detail hereinafter.

Second frame portion 32 includes side frame members 68 and 70 having a pair of cross members 72 secured to the underside thereof rearwardly of the forward ends of the side frame members 68 and 70. The forward ends of side frame members 68 and 70 are positioned inwardly of the rearward ends of side frame members 38 and 40 of first frame portion 30 and are pivotally secured thereto by means of bolts or pins 74 and 76, respectively. When the second frame portion 32 is in its operative or transport position, the forward ends of the side frame members 68 and 70 are supported upon the rearwardmost cross frame members 42 of first frame portion 30 (FIG. 1).

Rear frame portion 34 includes a pair of side frame members 78 and 80 having a pair of cross members 82 and 84 secured thereto and extending therebetween. Side frame members 78 and 80 are positioned between the side frame members 68 and 70 of second frame portion 32 and have their lower ends pivotally secured thereto by means of bolts 83 and 85, respectively. Hooks 86 and 88 are attached to supports 90 and 92 which are secured to the rack 94 of the ATV 12. When the rear frame portion 34 is in its folded position, it rests upon the cross frame members 72 of second frame portion 32 with the side frame members 78 being positioned between the rearward ends of side frame members 68 and 70 and flush therewith. When the rear frame portion 34 is pivotally moved upwardly to its upright position, the lower ends of side frame members 78 and 80 engage the rearwardmost cross frame member 72 to prevent further pivotal movement of the rear frame portion 34 with respect to second frame portion 32.

When it is desired to use the trailer, the second frame portion 32, with the rear frame portion 34 folded flush therewith, is pivotally moved from its folded position to the operative position so that second frame portion 32 extends rearwardly from first frame portion 30. Rear frame portion 34 is then pivotally moved upwardly to the operative position. Bolt 58 is then extended through bar members 50 and 52 and the rearward end of tongue member 54 to prevent pivotal movement of the tongue member 52 with respect to the first frame portion 30. The forward end of tongue member 60 is then secured to the hitch adapter 66. The materials, objects, etc., to be transported may then be loaded onto the trailer 10 and secured thereto. As the ATV 12 moves the trailer from one location to another, the forward end of the tongue member 28 may pivot about a horizontal axis with respect to the hitch adapter 66 with the forward end of the trailer being adapted to pivot about a vertical axis with respect to tongue member 60 by way of the bolt 62. The pivotal connection of the trailer, about both vertical and horizontal axes, permits the trailer and the tongue assembly to move with respect to one another to prevent damage to the tongue assembly, trailer and the ATV.

When it is desired to stow the trailer so that the trailer wheels are not in ground-engagement, bolt 58 is removed from bar members 50 and 52 and the rearward end of tongue member 54 so that tongue member 54 may pivot about bolt 56. Rear frame portion 34 is then folded downwardly so that it is received and lies between the side frame members 68 and 70 of second frame portion 32. Second frame portion 32, with rear frame portion 34 folded thereonto, is then folded forwardly about bolts 74 and 76 so that second frame portion 32 and rear frame portion 34 lie between side frame members 38 and 40 of first frame portion 30. The rearward end of the folded frame assembly is then pivotally moved upwardly with respect to tongue member 54 with the folded frame portions then being lifted upwardly so that the rearward ends of the supports 90 and 92 are positioned below one of the aligned sets of cross members so that the supports 90 and 92 may support the same. Hooks 86 and 88 limit the upward movement of the trailer with respect to the supports 90 and 92. Straps are then extended from the rack around the folded trailer to maintain the folded trailer in its substantially vertically disposed position. As the vehicle travels over regular and rough terrain, the conventional suspension system permits movement between the frame 20 and body 18 and vice versa. Such movement is not restricted by the folded trailer 10 inasmuch as the forward end of tongue member 60 is pivotally connected, about a horizontal axis, to the hitch adapter 66 by means of bolt 96 extending through openings 116 and 118 in hitch adapter 66 and through opening 64 in tongue member 60. The pivotal connection between tongue member 54 and the front frame portion 30, by means of the bolt 56, also permits the relative movement between the body 18 and the frame 20 of the ATV 12.

Due to the fact that the hitches of various ATVs are positioned above the ground at various heights and due to the fact that the hitches on the ATVs have varying thicknesses, and further due to the fact that the openings 26 in certain hitches are spaced at different distances from the rear of the hitch, and further due to the fact that it is desired to have a horizontal pivot connection between the hitch of the ATV and the forward end of the tongue of the trailer 10, the adjustable and reversible hitch adapter 66 is provided. Hitch adapter 66 includes a pair of spaced-apart side plates 100 and 102 which are L-shaped. Base plate 104 extends between the leg portions 106 and 108 of the plates 100 and 102, as seen in the drawings. An elongated slot 110 is provided in the base plate 104 and an elongated slot 112 is provided in the plate 114 which is positioned between the side plates 100 and 102. The upper ends of plates 100 and 102 are provided with openings 116 and 118, respectively.

Figure 3:
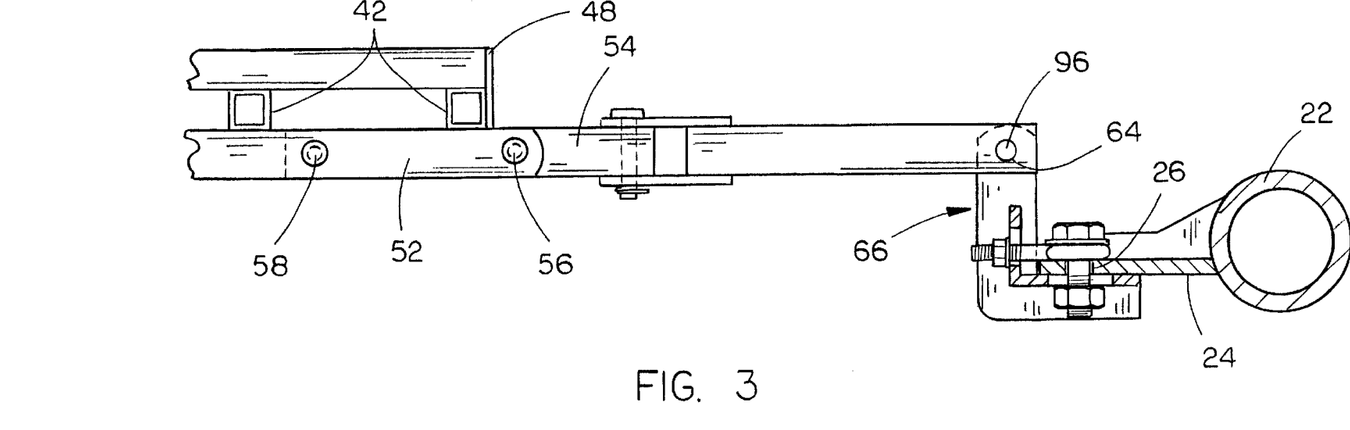
FIG. 3 is a partial side view of the forward end of the trailer, the hitch adapter and the hitch of the ATV.
Figure 4:
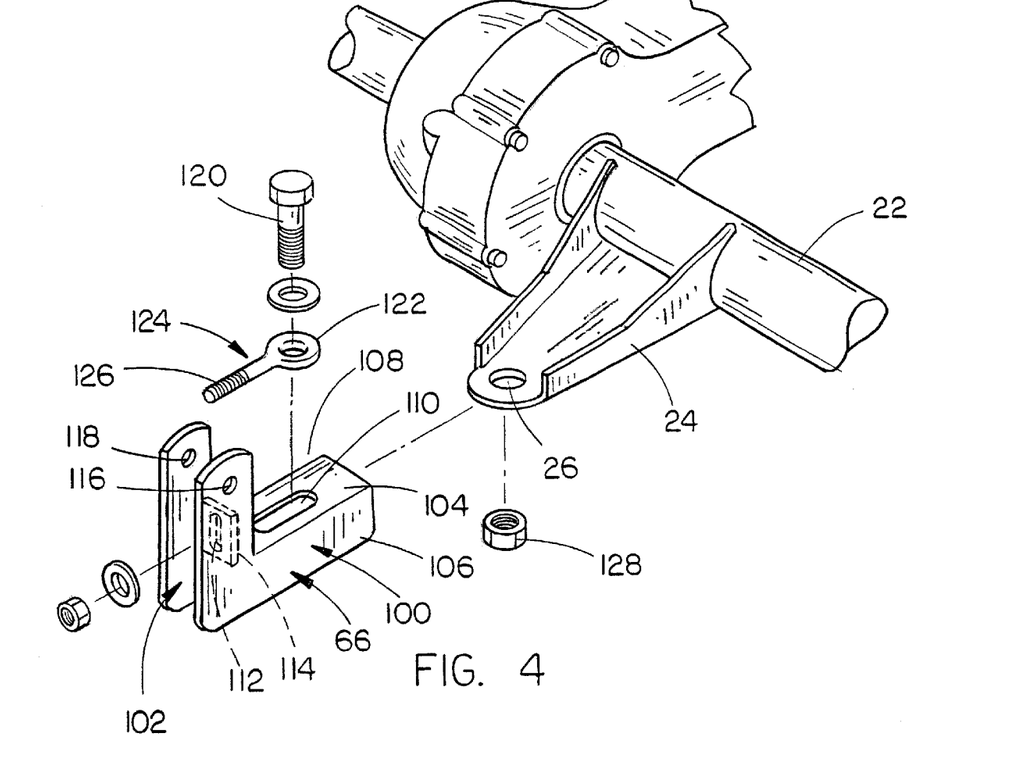
FIG. 4 is a partial exploded perspective view of the hitch adapter.
Figure 5:
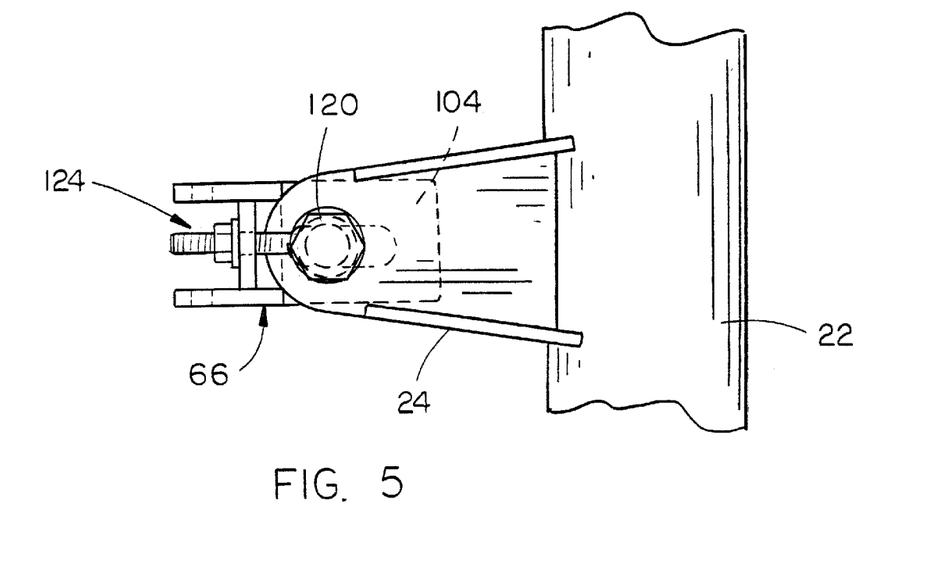
FIG. 5 is a top elevational view of the hitch adapter secured to the hitch of the ATV.
Figure 6:
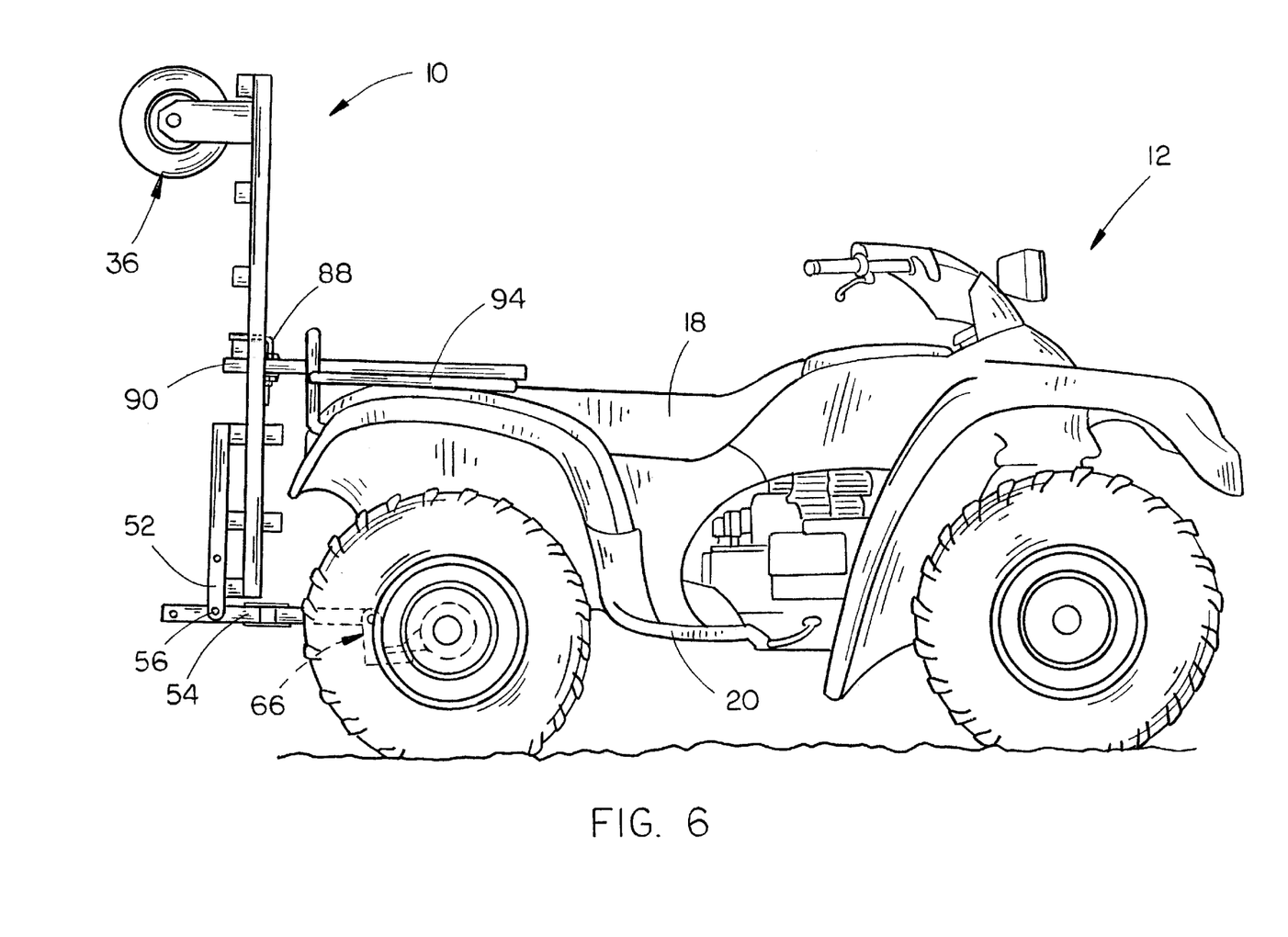
FIG. 6 is a side view illustrating the trailer in its folded and stowed condition.
Figure 7:
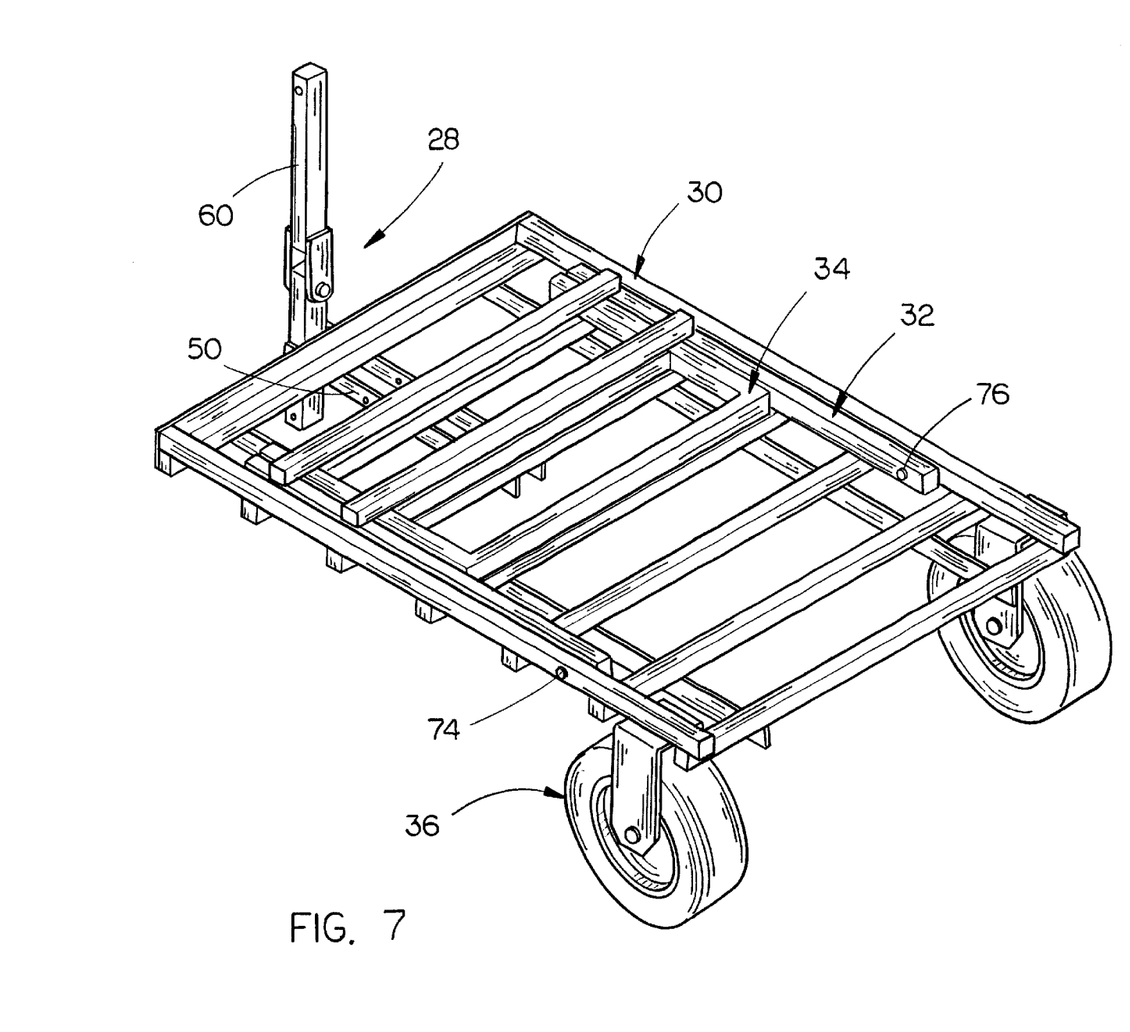
FIG. 7 is a rear perspective view of the trailer in its folded position.
Figure 8:
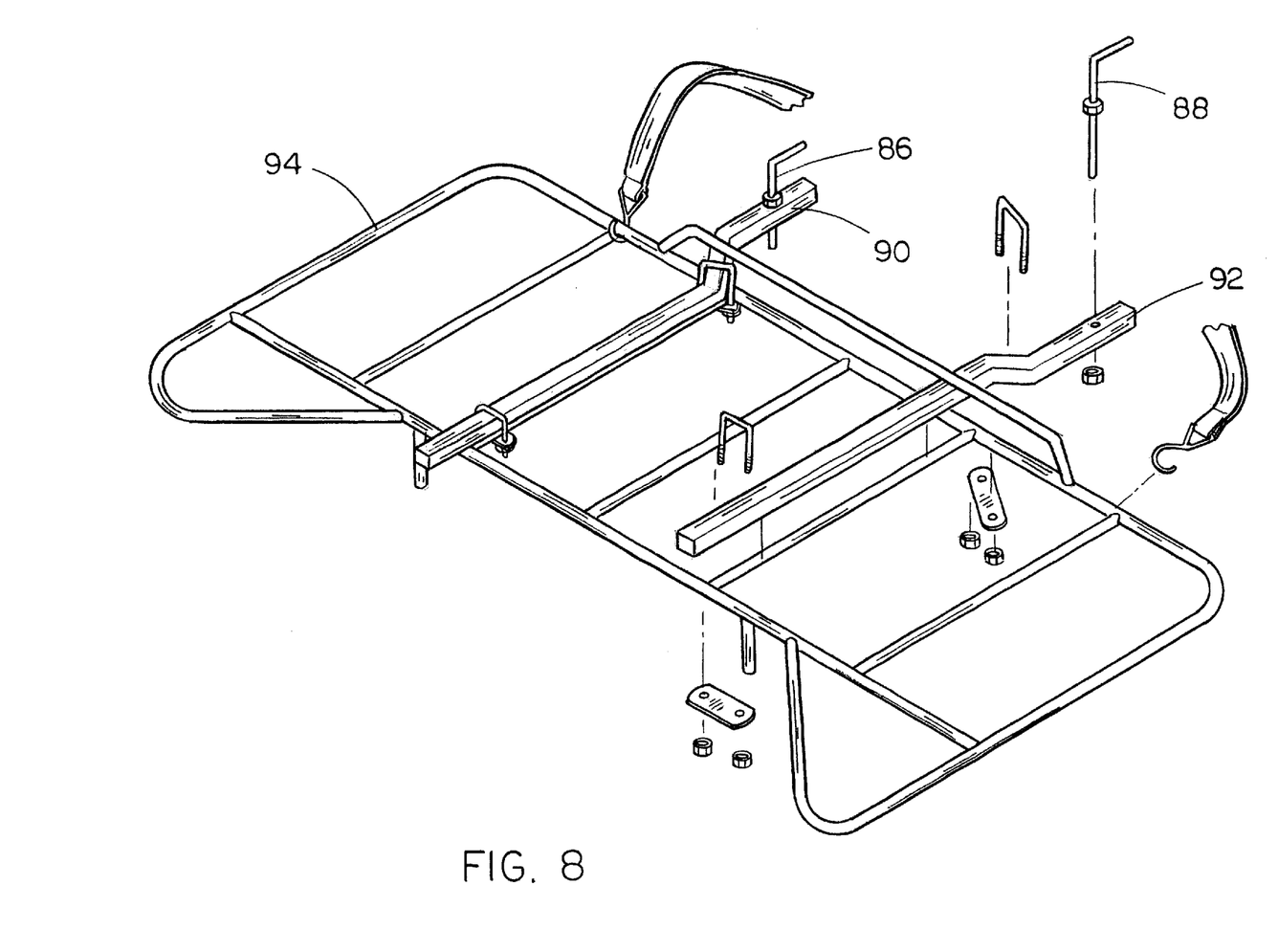
FIG. 8 is front perspective view of the rack of the ATV with the trailer supports mounted thereon.
Figure 9:
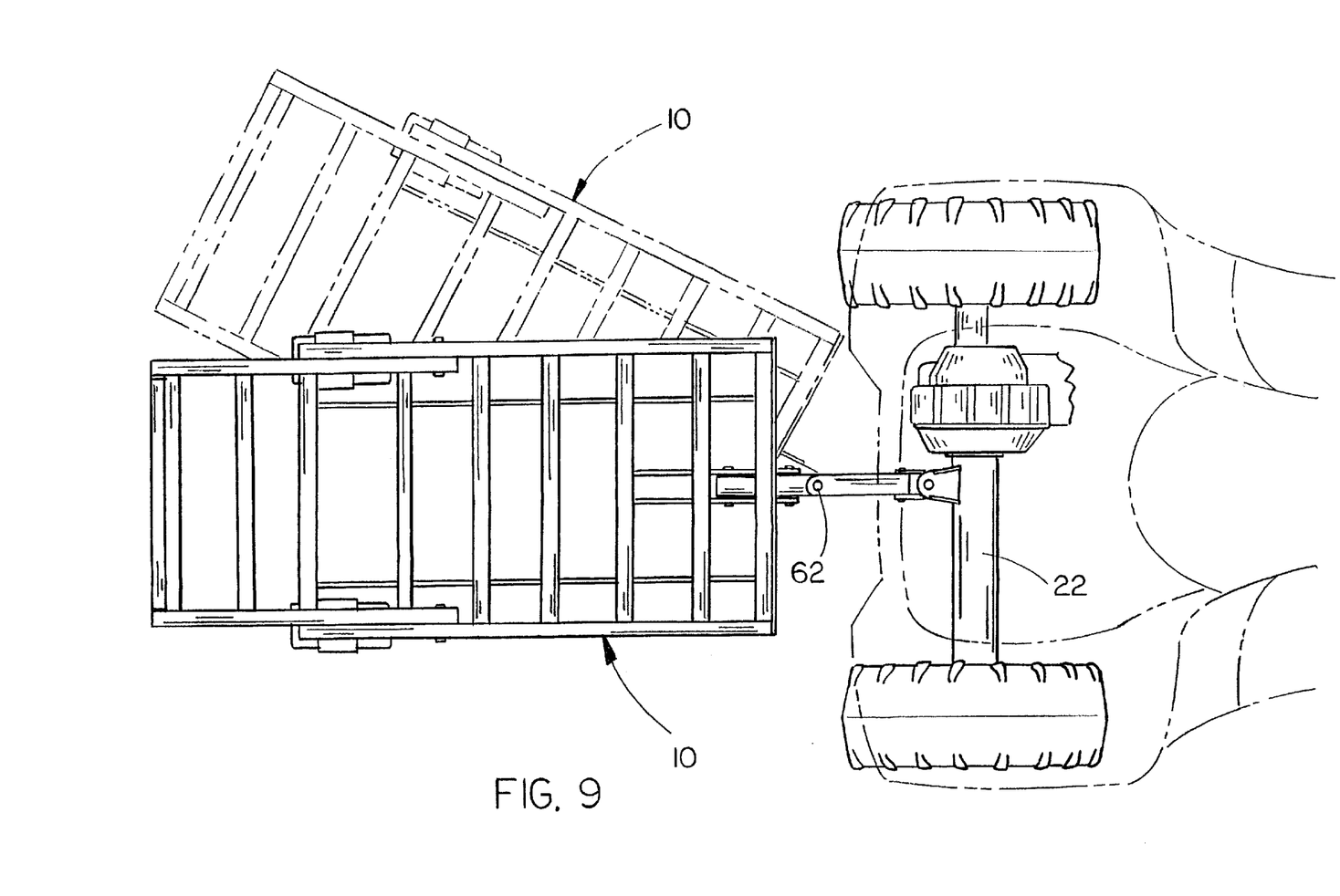
FIG. 9 is a top view illustrating the pivotal movement of the trailer with respect to the ATV.

Hitch adapter 66 may be secured to the hitch, as seen in FIGS. 3–5, by positioning plate 104 beneath the lower rearward end of hitch 24 and by extending the bolt 120 downwardly through the eye 122 of eye bolt 124 which has a threaded shank 126 extending from the eye 122. Bolt 120 is extended downwardly through the eye 122, through the opening 26, and through the slot 110 and is secured therein by means of nut 128. The elongated slot 110 enables the hitch adapter 66 to be moved forwardly and rearwardly with respect to the hitch 26 to enable hitches of various dimensions to be accommodated. Further, the threaded shank 126, by extending through the slot 112, enables the hitch adapter 66 to accommodate hitches having various thicknesses. The forward end of tongue member 60 is pivotally secured, about a horizontal axis, to the hitch adapter 66 by means of the bolt 96 extending through openings 116 and 118 and the opening 64 in tongue member 60. If the height of the hitch 24 is considerably higher than that shown in the drawings, the hitch adapter 66 may be rotated 180° so that the plate 104 rests upon the upper surface of hitch 24 so that the openings 116 and 118 are positioned well below the hitch 24.

Thus it can be seen that a novel folding trailer for an ATV has been provided. It can also be seen that a novel hitch adapter has been provided which enables the trailer to be connected to the hitches of various types of ATVs.

Thus it can be seen that the invention accomplishes at least all of its stated objectives.

I claim:

1. A hitch adapter for pivotally securing the forward end of a tongue member to the hitch of an all-terrain vehicle, said hitch including a rearwardly extending bar having a rearward end with an opening formed therein, comprising:

a first vertically disposed L-shaped side plate including a vertically extending rear plate portion and a horizontally extending front plate portion;

a second vertically disposed L-shaped side plate spaced from said first side plate and including a vertically extending rear plate portion and a horizontally extending front plate portion;

said rear plate portions each having upper and lower ends;

said front plate portions each having upper and lower ends;

a first joining plate extending between the upper ends of said front plate portions;

said first joining plate having an opening formed therein;

a second joining plate extending between said rear plate portions;

said second joining plate having an opening formed therein;

each of said rear plate portions having an opening formed therein below the upper ends thereof to enable a bolt or pin to be extended therethrough and through the forward end of the tongue member;

said first joining plate being positioned beneath the bar of the vehicle hitch;

an eye bolt having an eye portion and a rearwardly extending threaded shank portion;

said eye portion being positioned on the bar of the vehicle hitch with the threaded shank of said eye bolt extending through said opening in said second joining plate and being secured therein by a nut;

a hitch bolt extending downwardly through said eye portion, the opening in the bar of the hitch, and through said opening in said first joining plate and being secured therein by a nut.

2. The hitch adapter of claim 1 wherein said opening in said first joining plate comprises an elongated slot.

3. The hitch adapter of claim 1 wherein said opening in said second joining plate comprises an elongated slot.

4. The hitch adapter of claim 2 wherein said opening in said second joining plate comprises an elongated slot.

5. The hitch adapter of claim 1 wherein the hitch adapter may be rotated 180° with respect to the bar of the hitch and secured thereto so that said rear plate portions extend downwardly from the bar to position the bolt openings in said rear plate portions to be positioned below the bar.

* * * * *